United States Patent
Park et al.

(10) Patent No.: US 11,063,325 B2
(45) Date of Patent: Jul. 13, 2021

(54) POUCH-SHAPED SECONDARY BATTERY INCLUDING ELECTRODE LEAD USING CONDUCTIVE POLYMER

(71) Applicant: LG Chem, Ltd., Seoul (KR)

(72) Inventors: Jong Pil Park, Daejeon (KR); Kyoung Ho Kim, Daejeon (KR); Min Woo Lee, Daejeon (KR)

(73) Assignee: LG Chem, Ltd.

( * ) Notice: Subject to any disclaimer, the term of this patent is extended or adjusted under 35 U.S.C. 154(b) by 130 days.

(21) Appl. No.: 16/334,177

(22) PCT Filed: Apr. 10, 2018

(86) PCT No.: PCT/KR2018/004199
§ 371 (c)(1),
(2) Date: Mar. 18, 2019

(87) PCT Pub. No.: WO2018/199511
PCT Pub. Date: Nov. 1, 2018

(65) Prior Publication Data
US 2019/0207196 A1 Jul. 4, 2019

(30) Foreign Application Priority Data

Apr. 24, 2017 (KR) .................. 10-2017-0052485
Apr. 4, 2018 (KR) .................. 10-2018-0038969

(51) Int. Cl.
*H01M 50/531* (2021.01)
*H01M 10/052* (2010.01)
(Continued)

(52) U.S. Cl.
CPC ..... *H01M 50/531* (2021.01); *H01M 10/0413* (2013.01); *H01M 10/0436* (2013.01);
(Continued)

(58) Field of Classification Search
CPC .................................. H01M 2/345
See application file for complete search history.

(56) References Cited

U.S. PATENT DOCUMENTS 9,508,969 B2  11/2016  Yang et al.
2001/0038938 A1*  11/2001  Takahashi ............. H01M 2/021
                                                                    429/53
(Continued)

FOREIGN PATENT DOCUMENTS

EP    2429018 A1    3/2012
EP    2950371 A1    12/2015
(Continued)

OTHER PUBLICATIONS

International Search Report for PCT/KR2018/004199, dated Jul. 27, 2018.
(Continued)

*Primary Examiner* — Robert S Carrico
(74) *Attorney, Agent, or Firm* — Lerner, David, Littenberg, Krumholz & Mentlik, LLP (57) ABSTRACT

Disclosed herein is a pouch-shaped secondary battery including a pouch-shaped battery case surrounding an electrode assembly, a first electrode lead connected to the electrode assembly and extending to a joint of the battery case, a second electrode lead detachably connected to the first electrode lead and extending out of the battery case, a connection layer coupling the first electrode lead and the second electrode lead to each other, and a sealing layer coupling the battery case to the first electrode lead and the second electrode lead, wherein the first and second electrode leads are configured to be detached from one another in order to secure the safety of a pouch-shaped battery cell when the pouch-shaped battery cell swells due to gas generated in the pouch-shaped battery cell while the pouch-
(Continued)

shaped battery cell is in an abnormal state or when the pouch-shaped battery cell is overcharged.

11 Claims, 7 Drawing Sheets

(51) Int. Cl.
*H01M 10/04* (2006.01)
*H01M 50/172* (2021.01)
*H01M 50/183* (2021.01)
*H01M 50/543* (2021.01)
*H01M 50/557* (2021.01)
*H01M 50/578* (2021.01)

(52) U.S. Cl.
CPC ....... *H01M 10/052* (2013.01); *H01M 50/172* (2021.01); *H01M 50/183* (2021.01); *H01M 50/543* (2021.01); *H01M 50/557* (2021.01); *H01M 50/578* (2021.01); *H01M 2200/20* (2013.01); *H01M 2220/20* (2013.01)

(56) References Cited

U.S. PATENT DOCUMENTS

| | | |
|---|---|---|
| 2006/0238162 A1 | 10/2006 | Cheon et al. |
| 2007/0231701 A1* | 10/2007 | Lee .................. H01M 10/0436 429/246 |
| 2008/0268344 A1* | 10/2008 | Kim ................... H01M 50/557 429/246 |
| 2011/0104520 A1 | 5/2011 | Ahn |
| 2014/0011060 A1 | 1/2014 | Yang et al. |
| 2016/0028068 A1 | 1/2016 | Yang et al. |
| 2017/0110711 A1 | 4/2017 | Ahn et al. |
| 2017/0125786 A1* | 5/2017 | Park ........................ H01M 2/30 |
| 2017/0301959 A1 | 10/2017 | Takahashi et al. |
| 2018/0053976 A1 | 2/2018 | Park et al. |
| 2018/0062148 A1 | 3/2018 | Cho et al. |

FOREIGN PATENT DOCUMENTS

| | | |
|---|---|---|
| JP | 2004327047 A | 11/2004 |
| JP | 2005044523 A | 2/2005 |
| JP | 2005129442 A | 5/2005 |
| JP | 2006310308 A | 11/2006 |
| JP | 2011096664 A | 5/2011 |
| JP | 2015176789 A | 10/2015 |
| JP | 2016532991 A | 10/2016 |
| JP | 2017076601 A | 4/2017 |
| KR | 20110048470 A | 5/2011 |
| KR | 101192077 B1 | 10/2012 |
| KR | 20130117637 A | 10/2013 |
| KR | 101447064 B1 | 10/2014 |
| KR | 20140139793 A | 12/2014 |
| KR | 20140141262 A | 12/2014 |
| KR | 101601135 B1 | 3/2016 |
| KR | 20160125920 A | 11/2016 |
| WO | 2016171517 A1 | 10/2016 |
| WO | 2016178539 A1 | 11/2016 |
| WO | 2016199384 A1 | 12/2016 |

OTHER PUBLICATIONS

Extended European Search Report with Written Opinion for Application No. 18790460.2 dated Jan. 2, 2020, 9 pages.

* cited by examiner

< Lead film cutting 0 mm >

FIG. 9B

< Lead film cutting 1 mm >

FIG. 9C

< Lead film cutting 3 mm >

FIG. 9D

< Lead film cutting 5 mm >

FIG. 10A

Gas supply unit for inducing increase in inner pressure

Two-stage lead joint

FIG. 10B

Two-stage lead joint

Pouch lead film sealing portion

< Lead film cutting 0 mm >   < Lead film cutting 1 mm >

< Lead film cutting 3 mm >   < Lead film cutting 5 mm >

*FIG. 11E*

POUCH-SHAPED SECONDARY BATTERY INCLUDING ELECTRODE LEAD USING CONDUCTIVE POLYMER

CROSS-REFERENCE TO RELATED APPLICATIONS

This application is a national phase entry under 35 U.S.C. § 371 of International Patent Application No. PCT/KR2018/004199, filed on Apr. 10, 2018, published in Korean, which claims priority from Korean Patent Application Nos. 10-2017-0052485, filed on Apr. 24, 2017, and 10-2018-0038969, filed on Apr. 4, 2018, the disclosures of which are hereby incorporated herein by reference.

TECHNICAL FIELD

The present invention relates to a pouch-shaped secondary battery including an electrode lead using a conductive polymer, and more particularly to a pouch-shaped secondary battery including an electrode lead using a conductive polymer, wherein the electrode lead is configured to be cut in order to secure the safety of a pouch-shaped battery cell when the pouch-shaped battery cell swells due to gas generated in the pouch-shaped battery cell while the pouch-shaped battery cell is in an abnormal state or when the pouch-shaped battery cell is overcharged.

BACKGROUND ART

In general, there are various kinds of secondary batteries, such as a nickel cadmium battery, a nickel hydride battery, a lithium ion battery, and a lithium ion polymer battery. Such secondary batteries have been used in large-sized products that require high output, such as an electric vehicle and a hybrid electric vehicle, a power storage device for storing surplus power or new and renewable energy, and a backup power storage device, as well as small-sized products, such as a digital camera, a portable digital versatile disc (DVD) player, an MP3 player, a cellular phone, a personal digital assistant (PDA), a portable game device, a power tool, and an electric bicycle (E-bike).

A lithium secondary battery generally includes a positive electrode (a cathode), a separator, and a negative electrode (an anode). The materials of the positive electrode, the separator, and the negative electrode are selected in consideration of the lifespan, the charge and discharge capacity, the temperature characteristics, and the safety of the lithium secondary battery. In general, the lithium secondary battery is configured to have a three-layered structure, in which a positive electrode, a separator, and a negative electrode are sequentially stacked. Alternatively, the lithium secondary battery is configured to have a five-layered structure, in which a positive electrode, a separator, a negative electrode, a separator, and a positive electrode are sequentially stacked, or to have another five-layered structure, in which a negative electrode, a separator, a positive electrode, a separator, and a negative electrode are sequentially stacked. A plurality of unit cells is combined to constitute an electrode assembly or a secondary battery.

A lithium secondary battery is charged and discharged through a process in which lithium ions from a lithium metal oxide of a positive electrode are repeatedly intercalated into a negative electrode, such as a graphite electrode, and the lithium ions are repeatedly deintercalated from the negative electrode.

Heat may be generated from such a lithium secondary battery in the event of occurrence of a short circuit in the lithium secondary battery due to external impacts, overcharge of the lithium secondary battery, or overdischarge of the lithium secondary battery. As a result, an electrolyte may be decomposed in the lithium secondary battery, and thermal runaway may occur in the lithium secondary battery. That is, the safety of the lithium secondary battery is compromised in several aspects. In particular, the secondary battery may explode for various reasons. In one example, the secondary battery may explode due to an increase in the pressure of the air in the secondary battery, which is caused by the decomposition of an electrolyte. Specifically, when the secondary battery is repeatedly charged and discharged, gas may be generated in the secondary battery as the result of the electrochemical reaction between the electrolyte and an electrode active material. The gas generated in the secondary battery increases the pressure in the secondary battery. As a result, the fastening force between parts constituting the secondary battery may be reduced, the external case of the secondary battery may be damaged, a protection circuit of the secondary battery may be operated early, an electrode of the secondary battery may be deformed, a short circuit may occur in the secondary battery, or the secondary battery may explode.

In order to secure the safety of such a battery when a dangerous situation occurs, for example, when the battery is overcharged, overcurrent is prevented from flowing in the battery through the control of electronic parts, whereby the battery is prevented from being overcharged. To this end, a protection circuit, such as a protection circuit module (PCM), may be applied to the battery. Even in the case in which such an overcharge protection circuit, such as a PCM, is applied to the battery, however, it is difficult to sufficiently secure the safety of the battery. In particular, it is necessary for a pouch-shaped battery to be provided with a further improved protection circuit structure in order to more accurately check the swelling of the pouch-shaped battery.

In addition, there has been used a mechanical current interrupt device that physically interrupts the series connection of a battery pack using the pressure generated in the battery due to thermal expansion of the battery when the battery is overcharged in consideration of malfunction of the electronic parts of the battery. Generally, in the current interrupt device of the battery pack, there is widely used a method of physically cutting the series connection of the battery pack through the structure of the battery pack using only the pressure generated in the battery as the battery is expanded when the battery is overcharged in order to interrupt the flow of current in the battery pack. However, a sealing layer that is capable of interrupting the flow of current in a pouch-shaped battery when the volume of the pouch-shaped battery is increased has not been suggested.

Korean Registered Patent No. 1601135 discloses a pouch-shaped secondary battery configured to have a structure in which two lead plates are coupled to each other via a polymer material interposed between the lead plates, in which a vent notch is provided in order to rapidly discharge gas, generated in the secondary battery, out of the secondary battery when the pressure in the secondary battery reaches a predetermined level due to the gas, and in which first and second sealants, which are interposed between the lead plates, exhibit electrical insulation and thermal fusion properties. However, a structure in which a conductive polymer is interposed between electrode leads or between an electrode lead and an electrode tab and a structure in which a notch part is formed in a film that wraps the electrode leads or the electrode lead and the electrode tab are have been suggested.

Korean Patent Application Publication No. 2016-0125920 discloses a pouch-shaped secondary battery including an electrode assembly and a pouch sheathing member for receiving the electrode assembly, the pouch sheathing member including a first pouch unit and a second pouch unit, the first pouch unit and the second pouch unit being adhered to each other via a sealing unit, wherein the pouch-shaped secondary battery further includes a first electrode lead extending from the electrode assembly, the first electrode lead being attached to the first pouch unit, a second electrode lead attached to the second pouch unit, the second electrode lead being formed so as to protrude outwards from the pouch sheathing member, a first sealing member interposed between the first electrode lead and the second electrode lead for preventing the first electrode lead and the second electrode lead from contacting each other, and a film-shaped connection member for electrically connecting the first electrode lead and the second electrode lead to each other. However, the invention disclosed in this publication is different from the present invention in that the sealing member is not conductive.

Korean Registered Patent No. 1192077 discloses a secondary battery including an electrode assembly, which includes a first electrode, a second electrode, and a separator provided between the first electrode and the second electrode, a battery case for receiving the electrode assembly, an electrode terminal electrically connected to the first electrode, and a lead tab extending from the inside of the battery case out of the battery case, the lead tab being electrically connected to the first electrode via the electrode terminal, wherein the lead tab is formed so as to be separated from at least a portion of the electrode terminal such that, when the battery case is deformed in the state in which the lead tab is in contact with the battery case, the lead tab can be electrically disconnected from the first electrode, the secondary battery further includes an adhesive member for adhering the lead tab to the electrode terminal, and the adhesive member is provided with a through-hole, through which the lead tab is electrically connected to the electrode terminal. However, the invention disclosed in this publication is different from the present invention in that an insulative polymer is interposed between electrode leads or between an electrode lead and an electrode tab.

Korean Registered Patent No. 1447064 discloses a battery cell configured such that an electrode assembly having a positive-electrode/separator/negative-electrode structure is mounted in a receiving unit of a battery case, wherein tabs (electrode tabs) having no active material coated thereon protrude from electrode plates constituting the electrode assembly, an electrode lead for electrically connecting the electrode tabs to each other is located at one end of a stack of the electrode tabs, and the electrode lead is inserted into the electrode tabs at the electrical connection between the electrode tabs and the electrode lead due to the deformation of the electrode lead, whereby physical coupling between the electrode tabs and the electrode lead is achieved. However, a structure in which a conductive polymer is interposed between electrode leads or between an electrode lead and an electrode tab and a structure in which a notch part is formed in a film that wraps the electrode leads or the electrode lead and the electrode tab have not been suggested.

That is, a secondary battery including an electrode lead using a conductive polymer for short-circuiting a pouch-shaped secondary battery when the pressure in the battery increases or when the volume of the battery increases in an abnormal state of the battery, for example in the case in which the battery is overcharged or in the case in which gas is generated in the battery, has not been suggested.

RELATED ART DOCUMENT

[Patent Document]
Korean Registered Patent No. 1601135
Korean Patent Application Publication No. 2016-0125920
Korean Registered Patent No. 1192077
Korean Registered Patent No. 1447064

DISCLOSURE

Technical Problem

The present invention has been made in view of the above problems, and it is an object of the present invention to provide an electrode lead including two parts coupled to each other via an adhesive layer made of a conductive polymer, the electrode lead being configured to be cut in order to secure the safety of a pouch-shaped battery cell when the pouch-shaped battery cell swells due to gas generated in the pouch-shaped battery cell while the pouch-shaped battery cell is in an abnormal state or when the pouch-shaped battery cell is overcharged, and a pouch-shaped secondary battery including the same.

It is another object of the present invention to provide a simple short-circuit formation unit that is capable of maintaining the energy density of a battery cell without using an additional complicated device for interrupting the flow of current in the battery cell when the battery cell is in an abnormal state, for example, when the volume of the battery cell increases, and a pouch-shaped secondary battery including the same.

Technical Solution

In accordance with the present invention, the above and other objects can be accomplished by the provision of a pouch-shaped secondary battery including an electrode assembly constituted by a positive electrode and a negative electrode stacked in the state in which a separator is interposed between the positive electrode and the negative electrode, and a pouch-shaped battery case for receiving the electrode assembly, a first electrode lead having one end connected to the electrode assembly and the other end extending to a joint of the pouch-shaped battery case, a second electrode lead detachably connected to the first electrode lead, the second electrode lead extending out of the pouch-shaped battery case so as to be exposed, a connection layer for coupling the first electrode lead and the second electrode lead to each other, and a sealing layer for coupling the pouch-shaped battery case to the first electrode lead and the second electrode lead.

The connection layer may have a first coupling force between the first electrode lead and the second electrode lead that is smaller than a second coupling force between the sealing layer and the first electrode lead and the second electrode lead.

The sealing layer may be formed so as to wrap around a coupling portion at which the first electrode lead and the second electrode lead are coupled to each other by the connection layer.

The sealing layer may define a notch at one end thereof, the notch being formed at a location at which the sealing layer does not overlap either of the first electrode lead or the second electrode lead.

The boundary surface of the notch may be formed so as to have at least one shape selected from among: a linear shape, a triangular shape, a quadrangular shape, and a polygonal shape.

The width ($L_T$) of the sealing layer may be equal to or greater than the width ($L_L$) of the first electrode lead and the second electrode lead ($L_T \geq L_L$).

The connection layer may be made of a conductive polymer.

The sealing layer may be made of at least one selected from among a thermoplastic resin, a thermosetting resin, and a photo-curing resin, which exhibit high electrical insulation.

The connection layer may have a thickness of 1 to 500 μm.

The sealing layer may include a first sealing layer, provided between the first electrode lead and the side of the pouch-shaped battery case adjacent thereto for isolating the electrode assembly from the outside of the pouch-shaped battery case, and a second sealing layer, provided between the second electrode lead and the side of the pouch-shaped battery case adjacent thereto for isolating the electrode assembly from the outside of the pouch-shaped battery case.

The ratio ($C_L/L_L$) of the length ($C_L$) of the connection layer to the width ($L_L$) of the electrode lead may range from 0.01 to 1.

In accordance with another aspect of the present invention, there is provided a device including the pouch-shaped secondary battery.

In addition, the device may be selected from the group consisting of: an electronic device, an electric vehicle, a hybrid electric vehicle, and a power storage device.

BRIEF DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be 'directly connected' to the another part, but also, the one part may be 'indirectly connected' to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

Figure 1:
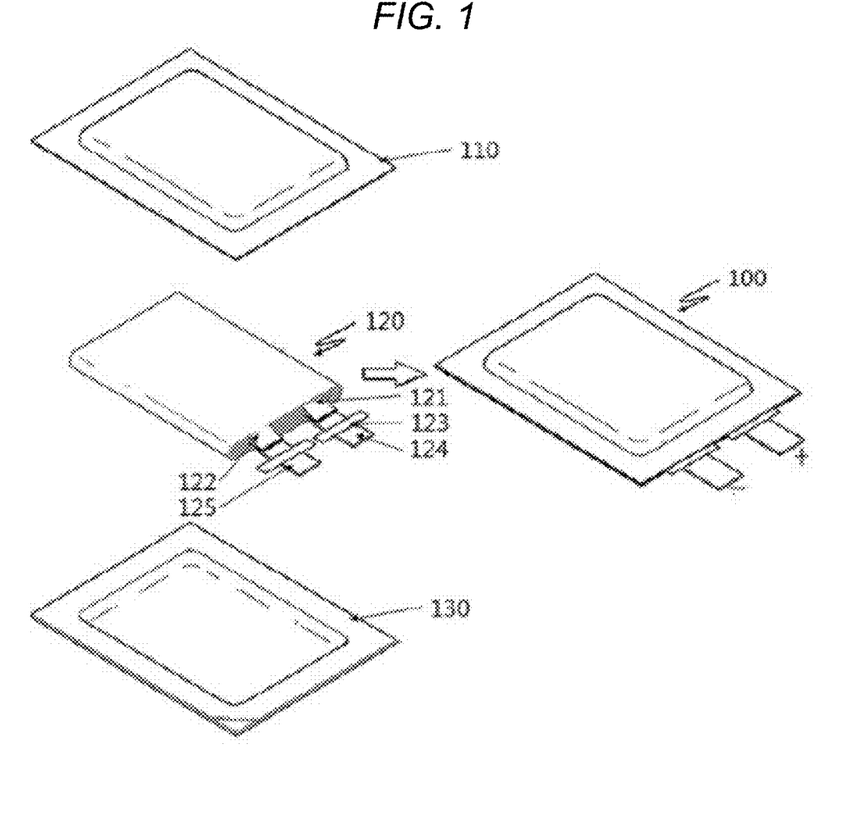
FIG. 1 is a view showing an illustrative conventional pouch-shaped battery cell.

FIG. 1 is a view showing an illustrative conventional pouch-shaped battery cell.

In general, a lithium secondary battery is manufactured as follows. First, a mixture of an active material, a binder, and a plasticizer is applied to a positive electrode current collector and to a negative electrode current collector in order to manufacture a positive electrode plate and a negative electrode plate, respectively. Subsequently, a plurality of positive electrode plates and a plurality of negative electrode plates are stacked in the state in which separators are interposed respectively between the positive electrode plates and the negative electrode plates in order to manufacture a battery cell having a predetermined shape. Subsequently, the battery cell is placed in a battery case, an electrolytic solution is injected into the battery case, and the battery case is sealed, whereby a secondary battery, such as a battery pack, is manufactured.

Electrode leads are connected to a general electrode assembly. Each of the electrode leads is configured to have a structure in which one end of the electrode lead is connected to the electrode assembly, the other end of the electrode lead is exposed outside of the battery case, and the battery case, in which the electrode assembly is placed, is sealed by an adhesive layer, such as a sealant layer, at the portion of the battery case from which the electrode lead extends outwards from the battery case.

In addition, the electrode assembly is provided with electrode tabs. Each current collector plate of the electrode assembly includes a coated part, on which an electrode active material is coated, and an end part (hereinafter, referred to as a "non-coated part"), on which the electrode active material is not coated. Each of the electrode tabs may be formed by cutting the non-coated part, or may be a separate conductive member connected to the non-coated part by ultrasonic welding. As shown, the electrode tabs may protrude in one direction such that the electrode tabs are formed at the electrode assembly so as to be arranged side by side. Alternatively, the electrode tabs may protrude in opposite directions or in a plurality of directions.

Each electrode tab serves as a path along which electrons move between the inside and the outside of the battery. Each of the electrode leads is connected to a corresponding one of the electrode tabs by spot welding. The electrode leads may extend in the same direction or in opposite directions depending on the position at which positive electrode tabs and negative electrode tabs are formed. A positive electrode lead and a negative electrode lead may be made of different materials. For example, the positive electrode lead may be made of the same material as the positive electrode plate, such as an aluminum (Al) material, and the negative electrode lead may be made of the same material as the negative electrode plate, such as a copper (Cu) material or a copper material coated with nickel (Ni). Finally, the electrode leads are electrically connected to external terminals via terminal parts thereof.

A pouch sheathing member accommodates the electrode assembly in a sealed state such that a portion of each of the electrode leads, i.e. the terminal part of each of the electrode leads, is exposed from the pouch sheathing member. As previously described, a sealing layer, such as a sealant layer, is interposed between each of the electrode leads and the pouch sheathing member. The pouch sheathing member is provided at the edge thereof with a sealed region. A horizontal slit in each of the electrode leads is spaced apart from the sealed region toward a joint. That is, in the case in which each of the electrode leads is formed so as to have an inverted T shape, the leg part of the T shape protrudes outwards from the pouch sheathing member, whereas a portion of the head part of the T shape is located in the sealed region.

In general, a positive electrode current collector plate is made of an aluminum material, and a negative electrode current collector plate is made of a copper material. When a swelling phenomenon occurs, copper foil tends to rupture more easily than aluminum foil. For this reason, the negative electrode lead may rupture more easily than the positive electrode lead. Preferably, therefore, an electrode lead capable of easily rupturing is used as the negative electrode lead.

In the normal state of the secondary battery, the electrode assembly is isolated from the outside due to the sealing layer. When the pressure in the battery increases as the result of overcharging the battery or an increase in the temperature of the battery, however, the battery case may swell. At this time, a weak portion of the battery case or a weak adhesion portion between another component of the secondary battery and the battery case ruptures, whereby gas is exhausted from the battery.

As long as the electrode leads are electrically connected to the electrode assembly, however, current continuously flows in the battery, making it very difficult to secure the safety of the battery. In order to solve this problem, the amount of electrolyte that is injected into the secondary battery may be adjusted, or the short-circuit pressure of a current interrupt device (CID) may be adjusted. In this case, however, the safety of the battery is reduced when the battery is overcharged. That is, it is difficult not only to secure the safety of the battery when the battery is overcharged but also to secure the safety of the battery when the battery is used in a high-temperature situation.

COMPARATIVE EXAMPLE

Figure 2:
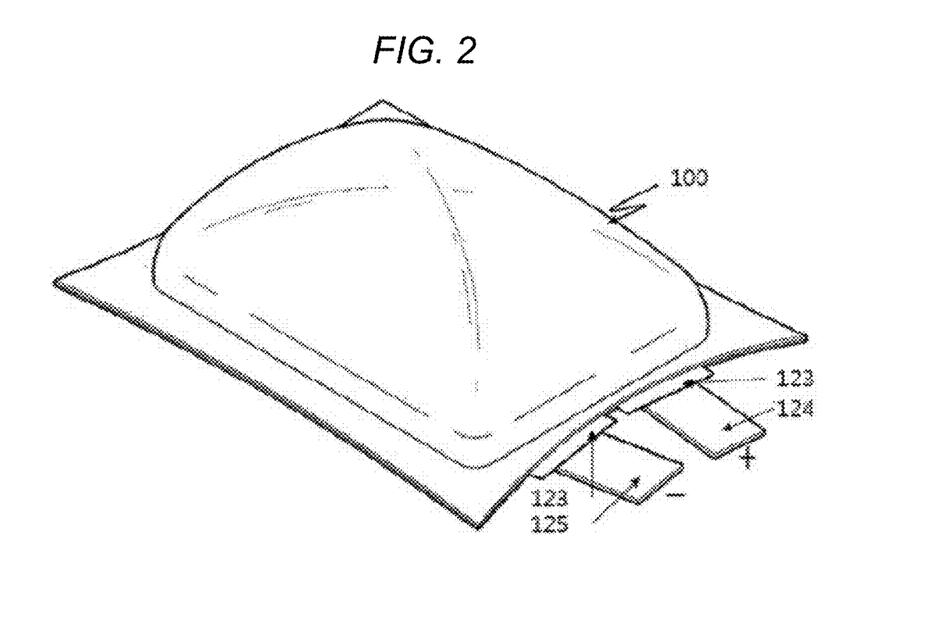
FIG. 2 is a view showing an increase in the volume of the illustrative pouch-shaped battery cell due to gas generated in the battery cell.

FIG. 2 is a view showing an increase in the volume of the illustrative pouch-shaped battery cell due to gas generated in the battery cell.

A pouch-shaped battery case includes a gas barrier layer and a sealant layer. The pouch-shaped battery case may further include a surface protective layer, which is the outermost layer formed on the gas barrier layer. The gas barrier layer is configured to prevent the introduction of gas into the battery cell. The gas barrier layer is mainly made of aluminum (Al) foil. The sealant layer is the innermost layer of the pouch-shaped battery case, which contacts the member placed in the pouch-shaped battery case, i.e. a cell. The surface protective layer is mainly made of a nylon resin in consideration of wear resistance and heat resistance. The pouch-shaped battery case is manufactured by processing a film having the above-described stack structure into the shape of a pouch. Components constituting the cell, such as positive electrodes, negative electrodes, and separators, are placed in the pouch-shaped battery case in the state of being impregnated with an electrolytic solution. After the components constituting the cell are placed in the pouch-shaped battery case, the sealant layers are sealed by thermal bonding at the entrance of the pouch-shaped battery case. Since each of the sealant layers contacts the components constituting the cell, it is necessary for each of the sealant layers to exhibit high insulation and high resistance to the electrolytic solution. In addition, it is necessary for each of the sealant layers to exhibit high sealability to such an extent that the pouch-shaped battery case can be isolated from the outside. That is, it is necessary for the sealing portion of the pouch-shaped battery case at which the sealant layers are sealed by thermal bonding to exhibit high thermal adhesive strength. In general, a sealant layer is made of a polyolefin-based resin, such as polypropylene (PP) or polyethylene (PE). In particular, each of the sealant layers of the pouch-shaped battery case is mainly made of polypropylene (PP), since polypropylene exhibits excellent mechanical properties, such as high tensile strength, high rigidity, high surface hardness, and high impact resistance, as well as high resistance to an electrolytic solution.

However, the conventional pouch-shaped secondary battery is unsafe from the aspect of risk of explosion. In general, heat and pressure are generated in a cell while electricity is produced/used (i.e. charged/discharged) in the cell (i.e. while an oxidation-reduction reaction occurs in the cell). At this time, high heat and pressure may be generated in the cell due to overcharging of the cell or a short circuit in the cell, which may be caused by an abnormal reaction in the cell. The cell may explode due to such high heat and pressure. The conventional pouch-shaped secondary battery is not provided with any technical means that is capable of preventing the explosion of the secondary battery. As a result, the conventional pouch-shaped secondary battery is exposed to explosion danger.

Embodiment 1

Figure 3:
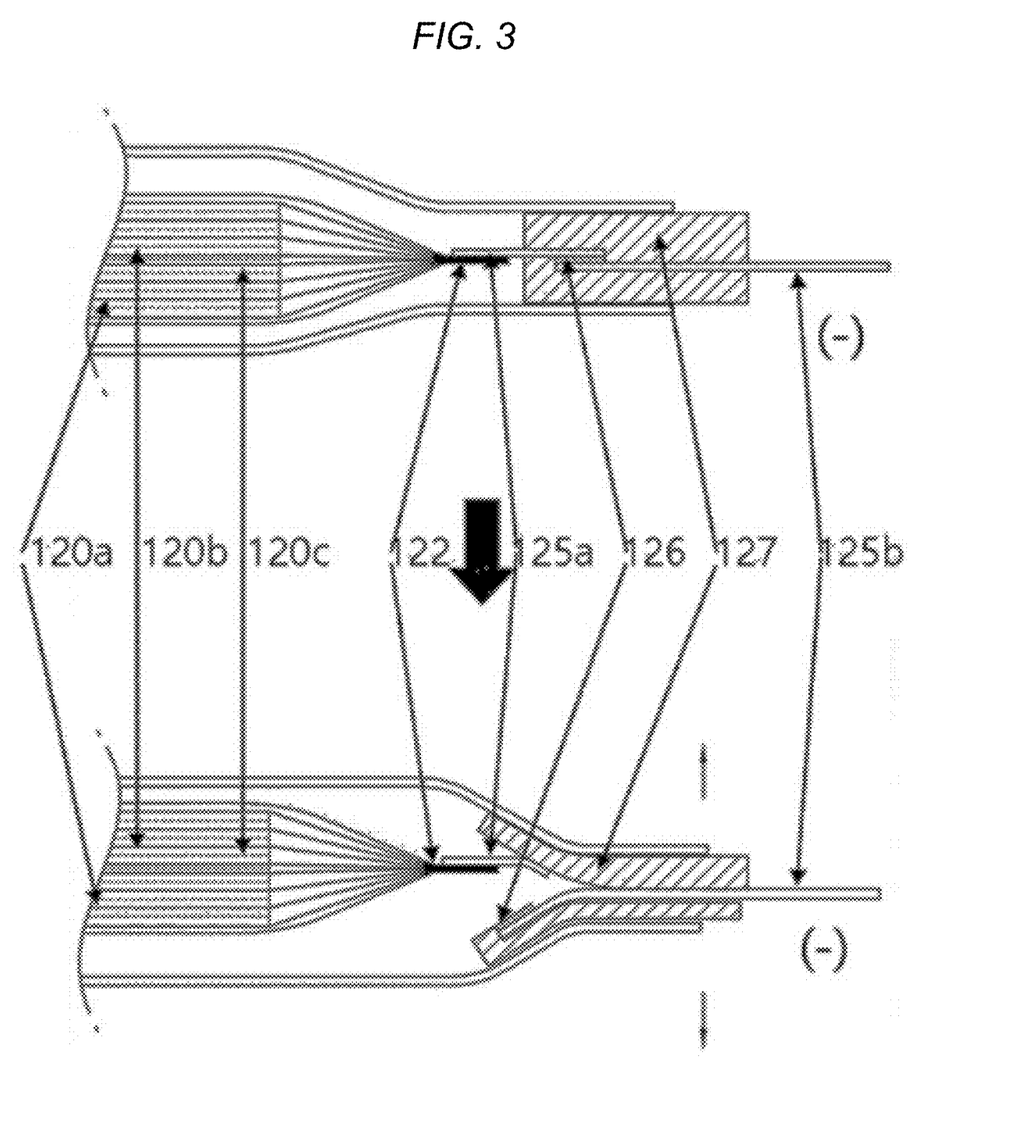
FIG. 3 is a view showing a pouch-shaped secondary battery having a connection layer and a sealing layer according to an embodiment of the present invention, before and after the pouch-shaped secondary battery is short-circuited.

FIG. 3 is a view showing a pouch-shaped secondary battery having a connection layer and a sealing layer according to an embodiment of the present invention, before and after the pouch-shaped secondary battery is short-circuited.

Figure 4:
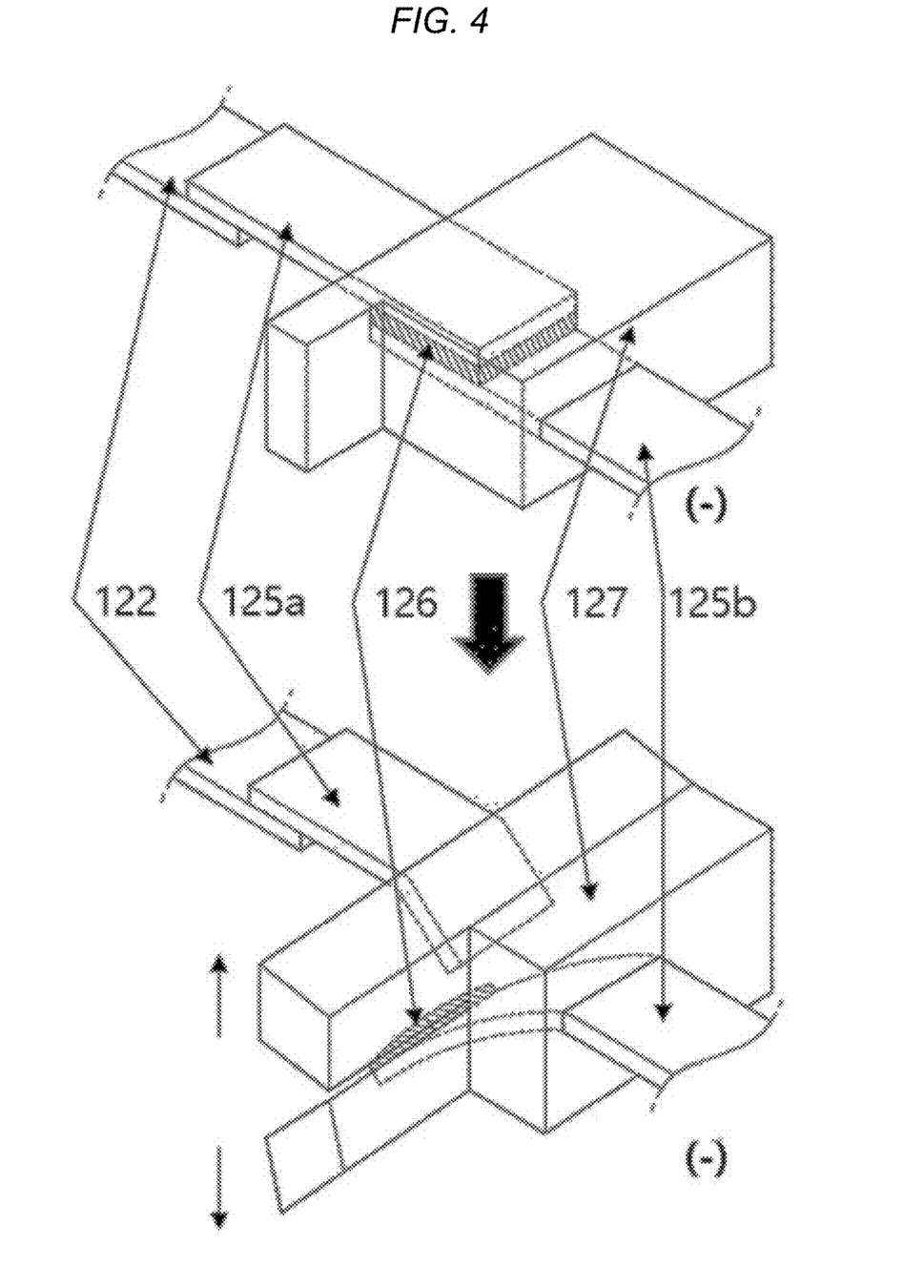
FIG. 4 is a perspective view showing an electrode lead unit of the pouch-shaped secondary battery having the connection layer and the sealing layer according to the embodiment of the present invention, before and after the electrode lead unit is cut.

FIG. 4 is a perspective view showing an electrode lead unit of the pouch-shaped secondary battery having the connection layer and the sealing layer according to the embodiment of the present invention, before and after the electrode lead unit is cut.

The pouch-shaped secondary battery may further include a sealing layer. The sealing layer is attached to a predetermined portion of the pouch-shaped battery case at which the electrode tab contacts the pouch-shaped battery case in order to seal the pouch-shaped battery case while insulating the electrode tab from the pouch-shaped battery case. When the pouch-shaped battery case is sealed, the pressure at the portion of the pouch-shaped battery case at which the electrode tab contacts the pouch-shaped battery case is relatively high. As a result, a casted polypropylene (CPP) layer of the pouch-shaped battery case may be easily damaged. Consequently, an inner layer of the sealing layer exhibits high mechanical strength and high heat resistance such that the shape of the sealing layer can be maintained, and thus electrical insulation between the pouch-shaped battery case and the electrode tab can be maintained when the pouch-shaped battery case is sealed by fusion in the state in which heat and pressure are applied to the pouch-shaped battery case. In particular, the inner layer of the sealing layer prevents aluminum foil of the pouch-shaped battery case from electrically contacting the electrode tab even when a portion of the aluminum foil of the pouch-shaped battery case is exposed during the sealing of the pouch-shaped battery case, whereby it is possible to maintain the insulated state of the pouch-shaped battery case. An outer layer of the sealing layer provides high adhesive force between the pouch-shaped battery case and the electrode tab even when a portion of the sealing layer is deformed in the state in which heat and pressure are applied to the pouch-shaped battery case, whereby it is possible to maintain the sealed state of the pouch-shaped battery case. Therefore, even when the casted polypropylene (CPP) layer of the pouch-shaped battery case is deformed due to heat and pressure during the sealing of the pouch-shaped battery case, whereby a portion of the aluminum foil of the pouch-shaped battery case is exposed, it is possible to maintain the insulated state of the pouch-shaped battery case.

A first electrode lead may be a first negative electrode lead or a first positive electrode lead.

A second electrode lead may be a second negative electrode lead or a second positive electrode lead.

The first negative electrode lead is connected to the negative electrode tabs shown in FIG. 3. The connection may be performed using at least one selected from the group consisting of ultrasonic welding, resistance welding, and laser welding.

The first negative electrode lead and the second electrode lead are connected to each other via the connection layer.

The connection layer may be made of a conductive polymer.

The conductive polymer may include a conductive agent.

At least one selected from among graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, nickel powder, gold powder, silver powder, or copper powder; or powder having a core-shell structure in which one kind of metal is coated on another kind of metal; conductive whisker, such as a zinc oxide or potassium titanate; a conductive metal oxide, such as a titanium oxide; and a conductive material, such as a polyphenylene derivative, may be used as the conductive agent. The polymer, which is a thermosetting polymer resin, may include at least one selected from among an acrylic resin, an epoxy resin, an ethylene propylene diene monomer (EPDM) resin, a chlorinated polyethylene (CPE) resin, silicone, polyurethane, a urea resin, a melamine resin, a phenol resin, an unsaturated ester resin, polypropylene (PP), polyethylene (PE), polyimide, and polyamide. Preferably, the polymer includes an acrylic resin.

In addition, the connection layer may have a thickness of 1 to 500 μm, preferably 15 to 300 μm. The reason for this is that, if the thickness of the connection layer deviates from the above range, conduction performance, heat dissipation performance, and energy density may be adversely affected.

The sealing layer may be formed so as to wrap the first negative electrode lead and the second negative electrode lead, which are connected to each other via the connection layer. The sealing layer may be coupled to the first negative electrode lead and to the second negative electrode lead more strongly than the connection layer. The surfaces of the connection layer that do not contact the first negative electrode lead and the second negative electrode lead may be coupled to the pouch-shaped battery case.

The sealing layer may be strongly coupled to the first negative electrode lead, the second negative electrode lead, and the pouch-shaped battery case.

When the pouch-shaped battery case swells due to the generation of gas in the secondary battery and an increase in the pressure in the secondary battery, which are caused from an abnormal state of the secondary battery, therefore, relatively weak coupling layers are separated from each other, whereby the first negative electrode lead and the second negative electrode lead are separated from each other.

The separation may occur first at a notch part formed in the sealing layer. Since the coupling force of the notch part is weak, the coupling structure of the notch part is changed due to the swelling of the pouch-shaped battery case, whereby the separation may occur first at the notch part in the sealing layer.

FIG. 4 is a perspective view showing the electrode lead unit of the pouch-shaped secondary battery having the connection layer and the sealing layer according to the embodiment of the present invention, before and after the electrode lead unit is cut.

The progression in which the electrode lead is cut over time will be described. When the secondary battery is in an abnormal state, gas is generated in the secondary battery, and the pressure in the secondary battery increases. As a result, the pouch-shaped battery case swells. As the pouch-shaped battery case swells, the sealing layer, which is strongly coupled to the pouch-shaped battery case, is deformed. At this time, separation occurs at the notch part, at which the sealing layer is relatively weakly coupled to the pouch-shaped battery case, and the electrode leads are also deformed. Finally, the connection layer, which relatively weakly couples the first electrode lead and the second electrode lead, is separated from one of the electrode leads, whereby the first electrode lead and the second electrode lead are separated from each other.

Embodiment 2

Figure 5A:
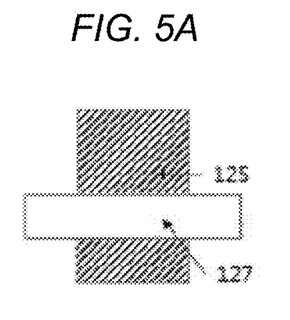
FIGS. 5A-5C are views showing the sealing layer formed at the electrode lead of the pouch-shaped secondary battery according to the embodiment of the present invention.
Figure 5B:
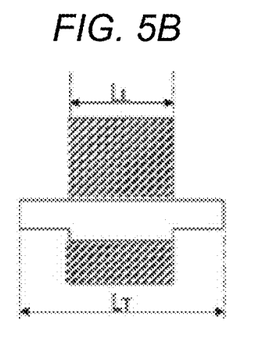
Figure 5C:
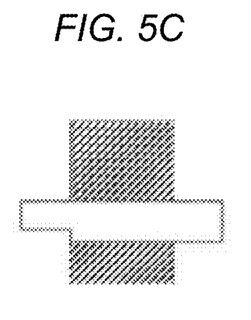
Figure 6A:
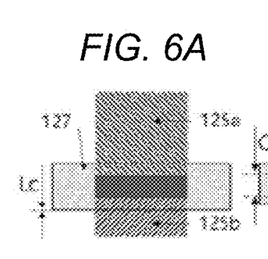
FIGS. 6A-6D are views showing cutting of the sealing layer formed at the electrode lead of the pouch-shaped secondary battery according to the embodiment of the present invention.
Figure 6B:
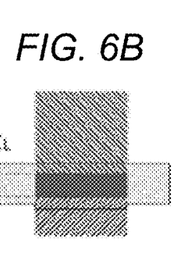
Figure 6C:
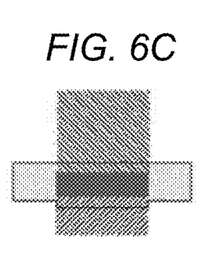
Figure 6D:
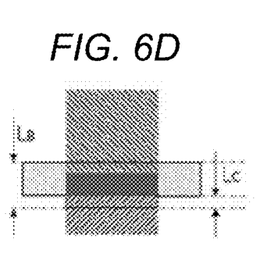
Figure 7A:
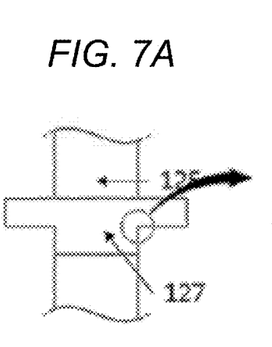
FIGS. 7A-7D are views showing the shape of a notch provided at the sealing layer formed at the electrode lead of the pouch-shaped secondary battery according to the embodiment of the present invention.
Figure 7B:
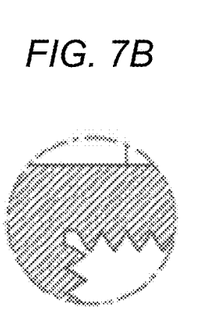
Figure 7C:
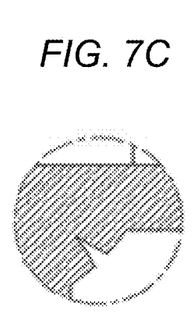
Figure 7D:
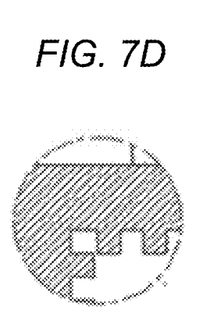

FIGS. 5A-5C are views showing the sealing layer formed at the electrode lead of the pouch-shaped secondary battery according to the embodiment of the present invention.

The sealing layer, which is formed so as to wrap the first negative electrode lead and the second negative electrode lead, which are connected to each other via the connection layer, may have any of various shapes. The sealing layer may have a shape of a general insulation tape. A notch 128 may be formed such that one end of the sealing layer corresponds to the width of the electrode lead. The notch may be formed at one of both ends of the sealing layer. In the case in which the notch is formed, the force for separating the electrode lead and the connection layer from each other in an abnormal state of the secondary battery may be reduced.

In addition, the width $L_T$ of the sealing layer may be equal to or greater than the width $L_L$ of the electrode lead ($L_T \geq L_L$).

Embodiment 3

FIGS. 6A-6D are views showing cutting of the sealing layer formed at the electrode lead of the pouch-shaped secondary battery according to the embodiment of the present invention.

The sealing layer, which is formed so as to wrap the first negative electrode lead and the second negative electrode lead, which are connected to each other via the connection layer, may have any of various shapes. The sealing layer may have a shape of a general insulation tape. The cutting ratio ($L_C/L_B$) of the cut $L_C$ to the length $L_B$ of the sealing layer at the joint at which the first negative electrode lead and the second negative electrode lead overlap each other may range from 0 to 0.5 or less.

If the cutting ratio is too small, the electrode lead may not be cut when a dangerous situation occurs, for example, when the pressure in the pouch-shaped battery case increases. If the cutting ratio is too large, the electrode lead may be cut even when the pouch-shaped secondary battery is in a normal state.

Embodiment 4

FIGS. 7A-7D are views showing the shape of the notch provided at the sealing layer formed at the electrode lead of the pouch-shaped secondary battery according to the embodiment of the present invention.

The boundary surface of the notch may be formed so as to have at least one selected from among a triangular shape, a quadrangular shape, and a polygonal shape. When the pouch-shaped battery case swells due to the generation of gas in the secondary battery and an increase in the pressure in the secondary battery, which are caused by an abnormal state of the secondary battery, therefore, it is possible to easily remove the sealing layer at the notch part in order to separate the relatively weak coupling layers from each other.

In addition, the sealing layer may be made of at least one selected from among a thermoplastic resin, a thermosetting resin, and a photo-curing resin, which exhibit high electrical insulation.

A thermoplastic, thermosetting, or photo-curing resin, which exhibits high electrical insulation, may be used as the polymer resin. For example, any one selected from among a styrene-butadiene resin, a styrene resin, an epoxy resin, a urethane resin, an acrylic-based resin, a phenol resin, an amide-based resin, an acrylate-based resin, and a denatured resin thereof may be used. Two or more kinds of resins may be used in a mixed state as needed. Among the polymer resins, the thermoplastic resin may be an elastomer, which serves as a matrix to support the formation of a film. The thermoplastic resin may have a softening point of about 100 to 250° C. The thermoplastic resin may account for 10 to 90 volume % of the total volume % of the polymer resin.

The polymer resin may be a thermosetting polymer resin, which may include at least one selected from among an acrylic resin, an epoxy resin, an ethylene propylene diene monomer (EPDM) resin, a chlorinated polyethylene (CPE) resin, silicone, polyurethane, a urea resin, a melamine resin, a phenol resin, an unsaturated ester resin, polypropylene (PP), polyethylene (PE), polyimide, and polyamide.

Preferably, an acrylic resin is used as the thermosetting polymer resin.

The sealing layer may have a thickness of 10 to 500 μm, preferably 15 to 300 μm. If the thickness of the sealing layer deviates from the above range, it is not possible to exhibit normal insulation performance.

Embodiment 5

Figure 8:
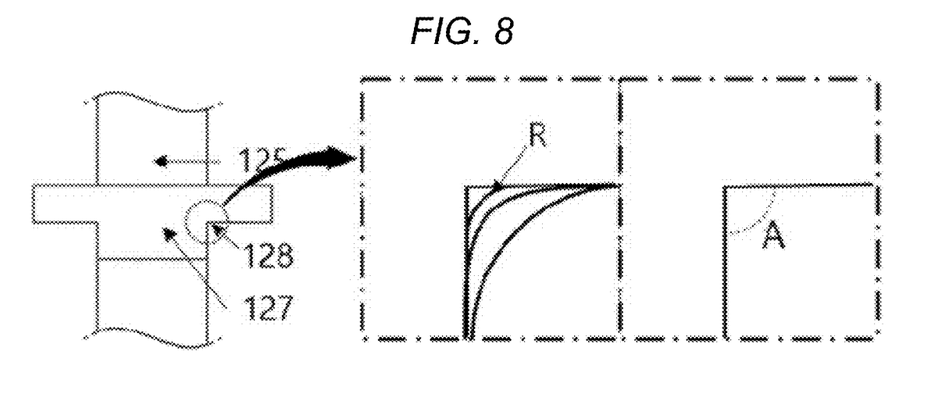
FIG. 8 is a view showing the radius of curvature and angle of the notch provided at the sealing layer formed at the electrode lead of the pouch-shaped secondary battery according to the embodiment of the present invention.
Figure 9A:
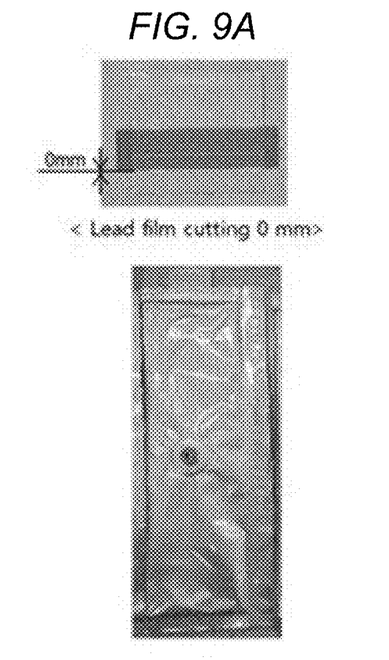
FIGS. 9A-9D are views showing a two-stage electrode lead current interrupt device (CID) according to an embodiment of the present invention and the shape of a pressurizable cell.
Figure 9B:
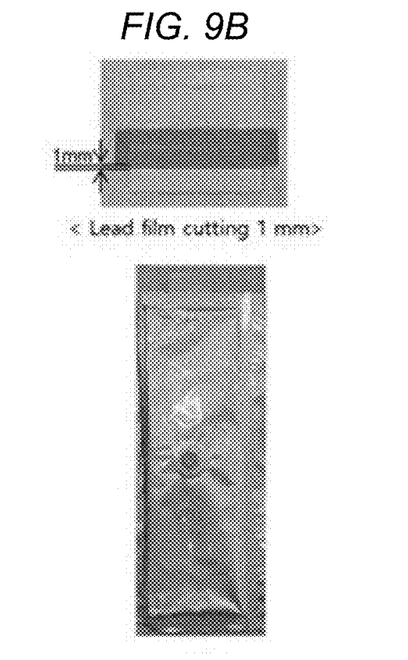
Figure 9C:
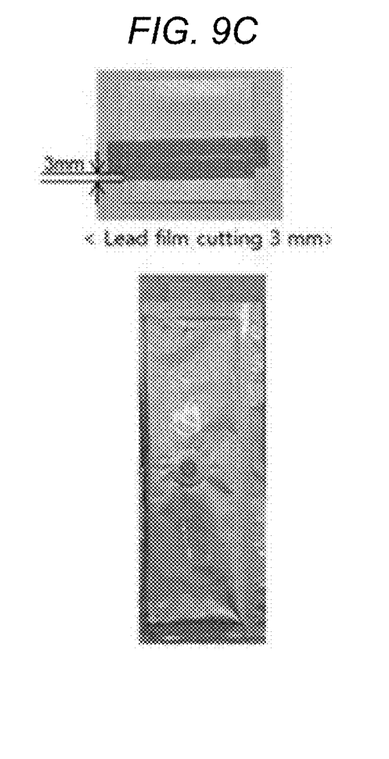
Figure 9D:
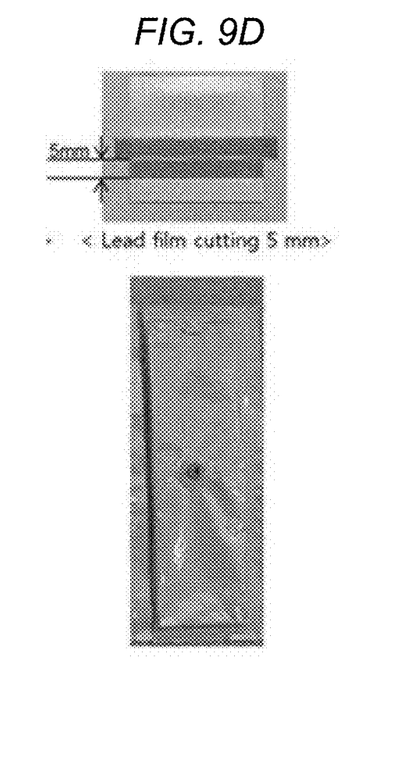

FIG. 8 is a view showing the radius of curvature and angle of the notch provided at the sealing layer formed at the electrode lead of the pouch-shaped secondary battery according to the embodiment of the present invention.

The notch may have a radius of curvature R of 0.5 mm or less, preferably 0.2 mm to 10 μm, more preferably 0.05 mm to 0.1 μm. If the radius of curvature of the notch deviates from the above range, the electrode lead may not be cut at the notch when a dangerous situation occurs, for example, when the pressure in the pouch-shaped battery case increases.

The notch may have an angle A ranging from greater than 0 degrees to less than 180 degrees, preferably from 90 degrees to 120 degrees, and more preferably from 45 degrees to less than 90 degrees.

If the angle of the notch deviates from the above range, the electrode lead may not be cut at the notch when a dangerous situation occurs, for example when the pressure in the pouch-shaped battery case increases.

In the case in which the notch is formed as described above, it is possible to easily remove the sealing layer at the notch part in order to separate the relatively weak coupling layers from each other when the pouch-shaped battery case swells due to the generation of gas in the secondary battery and due to an increase in the pressure in the secondary battery, which are caused by an abnormal state of the secondary battery.

At least one lithium-containing metal oxide selected from the group of a lithium cobalt oxide, a lithium nickel oxide, a lithium manganese oxide, a lithium cobalt-nickel oxide, a lithium cobalt-manganese oxide, a lithium manganese-nickel oxide, a lithium cobalt-nickel-manganese oxide, a lithium iron phosphate oxide having an olivine structure, and a lithium manganese oxide having a spinel structure, and an oxide obtained by replacing at least one of the above-specified elements with another element(s) different from the above-specified elements or doping another element(s) different from the above-specified elements may be used as the positive electrode active material. Here, the another element(s) may be at least one selected from the group consisting of Al, Mg, Mn, Ni, Co, Cr, V, and Fe.

A lithium metal, a lithium alloy (for example, an alloy of lithium and metal, such as aluminum, zinc, bismuth, cadmium, antimony, silicon, lead, tin, gallium, or indium), amorphous carbon, crystalline carbon, carbon composite, or $SnO_2$ may be used as the negative electrode active material. However, the present invention is not limited thereto.

In addition, the present invention may provide a device including a pouch-shaped secondary battery.

Here, the device may be selected from the group consisting of an electronic device, an electric vehicle, a hybrid electric vehicle, and a power storage device.

Experimental Example

The results of operation tests of a two-stage lead current interrupt device (CID) having applied thereto the first electrode lead and the second electrode lead, realized through the above embodiments, can be confirmed from FIGS. 9 to 11.

As shown in FIGS. 9A-9D, a pressurizable cell was manufactured in order to test the inner-pressure operation of a two-stage electrode lead current interrupt device (CID). The shape of the pressurizable cell was obtained, as shown in FIGS. 9A, 9B, 9C, and 9D, depending on the cutting conditions $L_C$ of a lead film as a sealing layer.

Figure 10A:
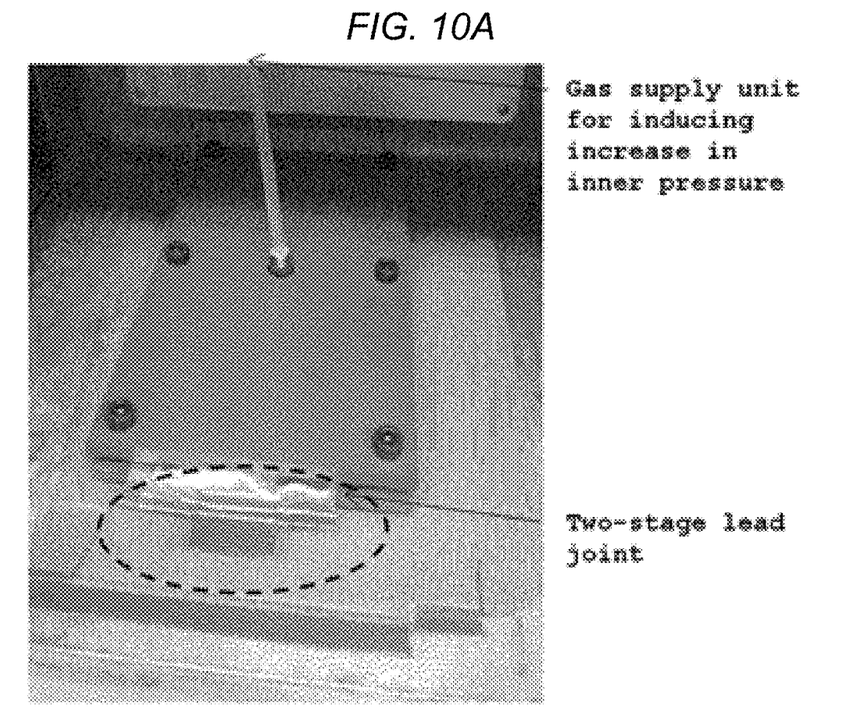
FIG. 10 is a photograph showing the experimental settings of the two-stage electrode lead CID according to the embodiment of the present invention.
Figure 10B:
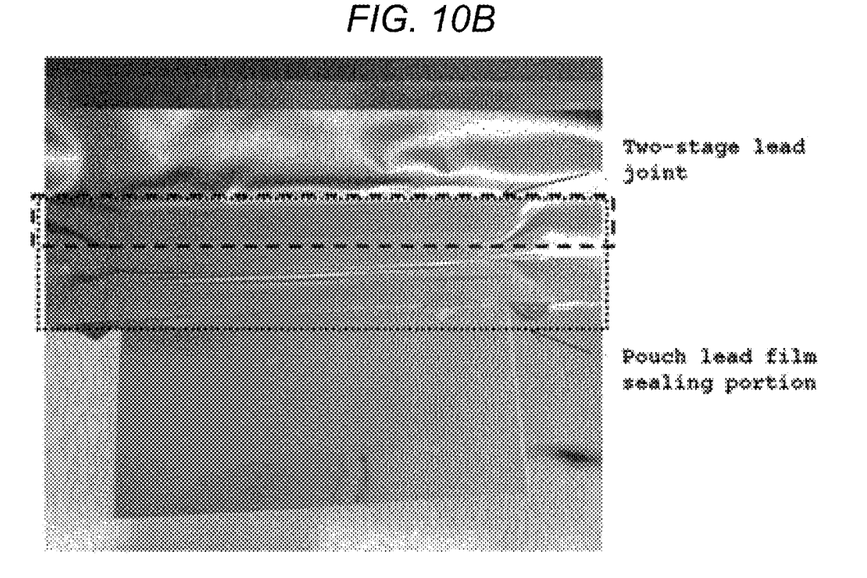
Figure 11A:
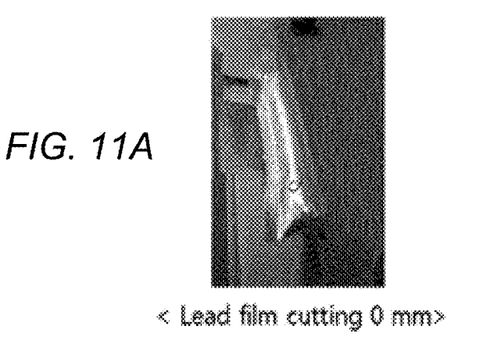
FIGS. 11A-11E are views showing the results of experimentation on the two-stage electrode lead CID according to the embodiment of the present invention.
Figure 11B:
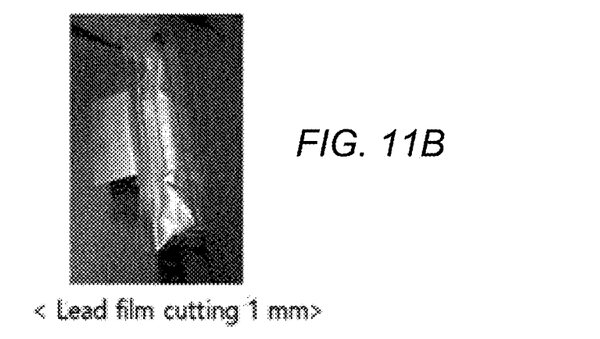
Figure 11C:
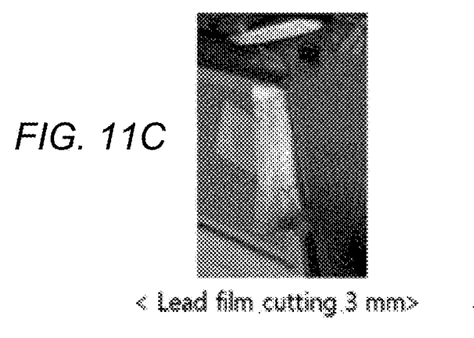
Figure 11D:
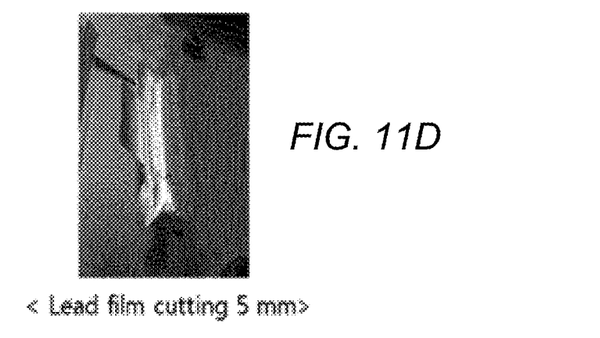
Figure 11E:
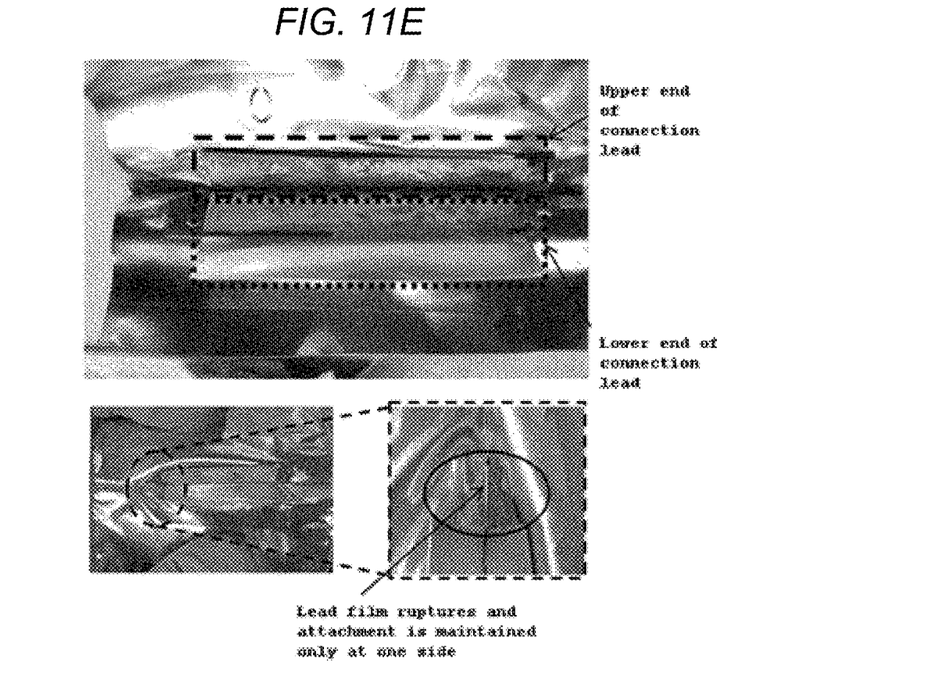

FIGS. 10A and 10B are photographs showing the experimental settings for confirming the inner-pressure operation of the two-stage electrode lead CID.

In order to induce a safety phenomenon according to an increase in the inner pressure of the cell, an air injection port and a two-stage electrode lead joint were confirmed, as shown in FIG. 10A, and a two-stage electrode lead CID joint of a pouch-shaped battery case and a pouch lead film sealing portion were confirmed, as shown in FIG. 10B.

FIGS. 11A-11E are views showing the results of experimentation on the operation of the two-stage electrode lead CID based on the amount of an electrode lead film attached to the side surface of a metal adhesion surface under electrode lead film cutting conditions shown in FIGS. 11A, 11B, 11C, 11D, and 11E.

It can be seen that the outer edge of the electrode lead ruptured as the pressure in the cell increased. It can be seen that the lead film of the connection lead ruptured as the pressure in the cell increased and the electrode lead CID was then operated. In addition, it can be seen that the two-stage electrode lead was operated under all film cutting conditions of 0 mm, 1 mm, 3 mm, and 5 mm.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

DESCRIPTION OF REFERENCE SYMBOLS

100: Battery cell
110: Upper pouch
120: Electrode assembly
120a: Negative electrode
120b: Positive electrode
120c: Separator
121: Positive electrode tab
122: Negative electrode tab
123: Insulation tape
124: Positive electrode lead
125: Negative electrode lead
125a: First negative electrode lead
125b: Second negative electrode lead
126: Connection layer
127: Sealing layer
128: Notch
130: Lower pouch

INDUSTRIAL APPLICABILITY

In the pouch-shaped secondary battery including the electrode lead using the conductive polymer according to the present invention, it is possible to prevent electric current from flowing in the pouch-shaped secondary battery when the battery is in an abnormal state, for example, in the case in which the pouch-shaped secondary battery is overcharged.

In addition, it is possible to prevent a reduction in the energy density of the pouch-shaped secondary battery, which may be caused as the result of reducing the size of the space defined in the pouch-shaped battery case for receiving the electrode current collector in the case in which an additional complicated device is provided in the pouch-shaped secondary battery.

In addition, it is possible to cut the electrode lead when the pouch-shaped secondary battery swells due to gas generated in the pouch-shaped secondary battery.

The invention claimed is:

1. A pouch-shaped secondary battery comprising:
   an electrode assembly including a positive electrode and a negative electrode stacked in a state in which a separator is interposed between the positive electrode and the negative electrode;
   a pouch-shaped battery case surrounding the electrode assembly;
   a first electrode lead having one end connected to the electrode assembly and the other end extending to a joint of the pouch-shaped battery case;
   a second electrode lead detachably connected to the first electrode lead, the second electrode lead extending out of the pouch-shaped battery case so as to be exposed to an outside of the pouch-shaped battery case;
   a connection layer coupling the first electrode lead and the second electrode lead to each other; and
   a sealing layer coupling the pouch-shaped battery case to the first electrode lead and the second electrode lead,
   wherein the sealing layer is formed so as to wrap around a coupling portion at which the first electrode lead and the second electrode lead are coupled to each other by the connection layer,
   wherein the sealing layer defines a notch at one end thereof, the notch being formed at a location at which the sealing layer does not overlap either of the first electrode lead or the second electrode lead, and
   wherein the sealing layer has a first width in a horizontal direction parallel to a planar surface of the first electrode lead and planar surface of the second electrode lead, and the sealing layer has a second width in the horizontal direction that is less than the first width, the notch being located at a transition point at which the sealing layer narrows from the first width to the second width.

2. The pouch-shaped secondary battery according to claim 1, wherein the connection layer has a first coupling force between the first electrode lead and the second electrode lead that is smaller than a second coupling force between the sealing layer and the first electrode lead and the second electrode lead.

3. The pouch-shaped secondary battery according to claim 1, wherein a boundary surface of the notch is formed so as to have at least one shape selected from among: a linear shape, a triangular shape, a quadrangular shape, and a polygonal shape.

4. The pouch-shaped secondary battery according to claim 1, wherein a width of the sealing layer is equal to or greater than a width of the first electrode lead and the second electrode lead.

5. The pouch-shaped secondary battery according to claim 1, wherein the connection layer is made of a conductive polymer.

6. The pouch-shaped secondary battery according to claim 1, wherein the sealing layer is made of at least one selected from among: a thermoplastic resin, a thermosetting resin, and a photo-curing resin.

7. The pouch-shaped secondary battery according to claim 1, wherein the connection layer has a thickness of 1 to 500 μm.

8. The pouch-shaped secondary battery according to claim 1, wherein the sealing layer comprises:

a first sealing layer provided between the first electrode lead and a first inner side of the pouch-shaped battery case adjacent thereto for isolating the electrode assembly from an outside of the pouch-shaped battery case; and a second sealing layer provided between the second electrode lead and a second inner side of the pouch-shaped battery case adjacent thereto for isolating the electrode assembly from the outside of the pouch-shaped battery case.

9. The pouch-shaped secondary battery according to claim 1, wherein a ratio of a length of the connection layer to a width of the electrode lead is between 0.01 and 1.

10. A device comprising the pouch-shaped secondary battery according to claim 1.

11. The device according to claim 10, wherein the device is selected from a group consisting of: an electronic device, an electric vehicle, a hybrid electric vehicle, and a power storage device.

* * * * *